(12) United States Patent
Ryu et al.

(10) Patent No.: US 11,184,614 B2
(45) Date of Patent: Nov. 23, 2021

(54) APPARATUS AND METHOD FOR PROCESSING IMAGE

(71) Applicant: HANWHA TECHWIN CO., LTD., Seongnam-si (KR)

(72) Inventors: Ji Hyung Ryu, Seongnam-si (KR); Il Sik Yang, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 0 days.

(21) Appl. No.: 16/796,376

(22) Filed: Feb. 20, 2020

(65) Prior Publication Data

US 2020/0195927 A1    Jun. 18, 2020

Related U.S. Application Data

(63) Continuation of application No. 16/432,296, filed on Jun. 5, 2019, now Pat. No. 10,574,991, which is a
(Continued)

(30) Foreign Application Priority Data

Sep. 26, 2016   (KR) .................. 10-2016-0123383

(51) Int. Cl.
*H04N 19/132*   (2014.01)
*H04N 19/124*   (2014.01)
(Continued)

(52) U.S. Cl.
CPC ........... *H04N 19/124* (2014.11); *G06T 5/002* (2013.01); *G06T 5/003* (2013.01); *G06T 5/20* (2013.01);
(Continued)

(58) Field of Classification Search
CPC .. H04N 19/117; H04N 19/132; H04N 19/137; H04N 19/142; H04N 19/146;
(Continued)

(56) References Cited

U.S. PATENT DOCUMENTS 6,343,098 B1 *   1/2002   Boyce .................. H04N 19/176
                                                        375/240.03
7,859,574 B1    12/2010   Alvarez et al.
(Continued)

FOREIGN PATENT DOCUMENTS

EP      2963929 A1    1/2016
JP    200835280 A     2/2008
(Continued)

OTHER PUBLICATIONS

Communication dated Apr. 20, 2018, issued by the European Patent Office in counterpart European Application No. 17177939.0.
(Continued)

*Primary Examiner* — Nguyen T Truong
(74) *Attorney, Agent, or Firm* — Sughrue Mion, PLLC

(57) ABSTRACT

An image processing apparatus includes an image processor and an encoder. The image processor enhances an edge of an input image, removes noise from the input image, synthesizes the edge-enhanced image and the noise-removed image, and removes a high frequency from the synthesized image. The encoder pre-encodes a downsized synthesized image, obtains a pre-bit rate of the pre-encoded image, sets a quantization parameter value based on a reference bit rate and the pre-bit rate, and compresses the high-frequency removed image based on the quantization parameter value.

20 Claims, 6 Drawing Sheets

Related U.S. Application Data continuation of application No. 15/422,584, filed on Feb. 2, 2017, now Pat. No. 10,362,308.

(51) Int. Cl.

| | | |
|---|---|---|
| *H04N 19/172* | (2014.01) | |
| *H04N 19/117* | (2014.01) | |
| *H04N 19/137* | (2014.01) | |
| *H04N 19/146* | (2014.01) | |
| *H04N 19/194* | (2014.01) | |
| *H04N 19/167* | (2014.01) | |
| *H04N 19/85* | (2014.01) | |
| *H04N 19/59* | (2014.01) | |
| *H04N 19/142* | (2014.01) | |
| *H04N 19/184* | (2014.01) | |
| *G06T 5/00* | (2006.01) | |
| *G06T 5/20* | (2006.01) | |
| *G06T 5/50* | (2006.01) | |

(52) U.S. Cl.
CPC ............ *G06T 5/50* (2013.01); *H04N 19/117* (2014.11); *H04N 19/132* (2014.11); *H04N 19/137* (2014.11); *H04N 19/142* (2014.11); *H04N 19/146* (2014.11); *H04N 19/167* (2014.11); *H04N 19/172* (2014.11); *H04N 19/184* (2014.11); *H04N 19/194* (2014.11); *H04N 19/59* (2014.11); *H04N 19/85* (2014.11); *G06T 2207/20221* (2013.01)

(58) Field of Classification Search
CPC .. H04N 19/167; H04N 19/172; H04N 19/184; H04N 19/194; H04N 19/59; H04N 19/85; G06T 5/002; G06T 5/003; G06T 5/20; G06T 5/50

USPC .................................................. 375/240.03
See application file for complete search history.

(56) References Cited

U.S. PATENT DOCUMENTS

| | | | |
|---|---|---|---|
| 2006/0048193 A1 | 3/2006 | Jacobs et al. | |
| 2007/0217507 A1 | 9/2007 | Kazui et al. | |
| 2010/0022878 A1* | 1/2010 | Azuma | G06T 5/003 |
| | | | 600/443 |
| 2011/0249133 A1* | 10/2011 | Zhou | H04N 19/117 |
| | | | 348/222.1 |
| 2012/0033854 A1 | 2/2012 | Jo | |
| 2013/0195178 A1* | 8/2013 | Price | H04N 19/176 |
| | | | 375/240.03 |
| 2015/0319439 A1 | 11/2015 | Jang et al. | |

FOREIGN PATENT DOCUMENTS

| | | |
|---|---|---|
| KR | 10853931 B1 | 8/2008 |
| KR | 100975311 B1 | 8/2010 |
| KR | 1020120013767 A | 2/2012 |
| KR | 101526490 B1 | 6/2015 |
| KR | 1020150126438 A | 11/2015 |

OTHER PUBLICATIONS

Communication dated Jan. 22, 2018 issued by the European Patent Office in counterpart Application No. 17177939.0.

Communication dated Aug. 16, 2021, from the European Patent Office in European Application No. 21167726.5.

* cited by examiner

APPARATUS AND METHOD FOR PROCESSING IMAGE

CROSS-REFERENCE TO RELATED APPLICATION

This application is a continuation of U.S. application Ser. No. 16/432,296, filed Jun. 5, 2019, which is a continuation application of Ser. No. 15/422,584, filed Feb. 2, 2017, now U.S. Pat. No. 10,362,308, issued on Jul. 23, 2019, which claims priority from Korean Patent Application No. 10-2016-0123383, filed on Sep. 26, 2016, in the Korean Intellectual Property Office, the disclosures of which are incorporated herein in their entireties by reference.

BACKGROUND

1. Field

One or more embodiments relate to an apparatus and a method for processing an image.

2. Description of the Related Art

Recently, cameras have been increasingly installed inside or outside of public buildings or on streets for a variety of purposes, for example, crime prevention, security, store management, etc. The cameras may be connected to one another via a network in a wired and/or wireless method and operate as network cameras.

In addition, a person who manages a place such as a building or a store monitored by cameras may manage the place via a method of remotely accessing the cameras by using a personal computer.

SUMMARY

One or more exemplary embodiments include an apparatus and a method for processing an image having a reduced transmission bit rate.

According to an aspect of an exemplary embodiment, an image processing apparatus includes an image processor configured to enhance an edge of an input image, remove noise from the input image, synthesize the edge-enhanced image and the noise-removed image, and remove a high frequency from the synthesized image, and an encoder configured to pre-encode a downsized synthesized image, obtain a pre-bit rate of the pre-encoded image, set a quantization parameter value based on a reference bit rate and the pre-bit rate, and compress the high-frequency removed image based on the quantization parameter value.

The encoder may be configured to set the quantization parameter value corresponding to the reference bit rate in response to determining that the pre-bit rate is greater than a downsized reference bit rate, the downsized reference bit rate being a reference bit rate reduced by a rate in which the synthesized image is downsized to the downsized synthesized image.

The image processor may be configured to, in response to detecting an event in the input image, increase a cutoff frequency to remove the high frequency from the synthesized image.

In response to detecting an event in the input image by the image processor, the encoder may be configured to increase a frame rate of the high-frequency removed image.

The encoder may be configured to obtain a current bit rate of a current image, and in response to determining that the current bit rate is greater than the reference bit rate, the image processor may be configured to increase at least one of an edge enhancement level, a noise removal level, and a cutoff frequency level to remove the high frequency, with respect to a next image.

In response to detecting an event in the input image by the image processor, the encoder may be configured to insert an I frame to compress the high-frequency removed image.

In response to detecting an event in the input image by the image processor, the encoder may be configured to increase the quantization parameter value.

In response to detecting an event in the input image by the image processor, the encoder may be configured to decrease the quantization parameter value of an area in which the event is detected.

According to another aspect of an exemplary embodiment, a image processing apparatus includes an image processor configured to enhance an edge of an input image, remove noise from the input image, synthesize the edge-enhanced image and the noise-removed image, and remove a high frequency from the synthesized image, and an encoder configured to compress the high-frequency removed image. In response to detecting an event in the image, the image processor is configured to increase a cutoff frequency to remove high frequency from the synthesized image.

In response to detecting the event by the image processor, the encoder may be configured to increase a frame rate to compress the high-frequency removed image.

The encoder may be configured to obtain a current bit rate of a current image, and in response to determining that the current bit rate is greater than a reference bit rate, the image processor may be configured to increases at least one of an edge enhancement level, a noise removal level, and a cutoff frequency level to remove the high frequency, with respect to a next image.

The event may include at least one of a movement of an object, a change of a scene, generation of noise, a movement of a background, panning of a camera module, tilting of the camera module, zooming of the camera module, and detection of a human face in the input image.

According to still another aspect of an exemplary embodiment, an image processing method includes enhancing, by an image processer, an edge of an input image, removing, by the image processor, noise from the input image, synthesizing, by the image processor, the edge-enhanced image and the noise-removed image, removing, by the image processor, a high frequency from the synthesized image, increasing, by an encoder, a frame rate in response to detecting an event in the input image by the image processor, and compressing, by the encoder, the high-frequency removed image based on the increased frame rate.

The image processing method may further include obtaining, by the encoder, a current bit rate of the image, and in response to determining that the current bit rate is greater than a predetermined reference bit rate, increasing, by the image processor, at least one of an edge enhancement level, a noise removal level, and a cutoff frequency level to remove the high frequency, with respect to a next image.

BRIEF DESCRIPTION OF THE DRAWINGS

The above and other aspects and features of the exemplary embodiments will become more apparent by with reference to the attached drawings, in which.

DETAILED DESCRIPTION

Figure 1:
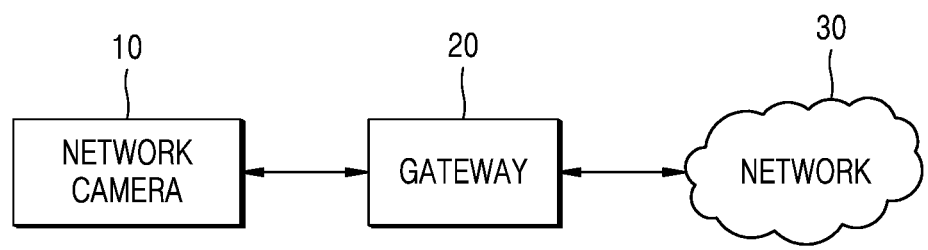
FIG. 1 is a block diagram of a surveillance system according to an exemplary embodiment.

As the inventive concept allows for various changes and numerous embodiments, embodiments will be illustrated in the drawings and described in detail in the written description. However, this is not intended to limit the present inventive concept to particular modes of practice, and it is to be appreciated that all changes, equivalents, and substitutes that do not depart from the spirit and technical scope of the present inventive concept are encompassed in the present inventive concept. In the description of the present inventive concept, certain detailed explanations of the related art are omitted when it is deemed that they may unnecessarily obscure the essence of the inventive concept.

While such terms as "first," "second," etc., may be used to describe various components, such components must not be limited to the above terms. The above terms are used only to distinguish one component from another.

The terms used in the present specification are merely used to describe embodiments, and are not intended to limit the present inventive concept. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The present inventive concept may be described in terms of functional block components and various processing steps. Such functional blocks may be realized by any number of hardware and/or software components configured to perform the specified functions. For example, the present inventive concept may employ various integrated circuit (IC) components, e.g., memory elements, processing elements, logic elements, look-up tables, and the like, which may carry out a variety of functions under the control of one or more microprocessors or other control devices. Similarly, where the elements of the present inventive concept are implemented using software programming or software elements, the inventive concept may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the present inventive concept could employ any number of conventional techniques for electronics configuration, signal processing and/or control, data processing and the like. The words "mechanism," "element," "means," and "configuration" are used broadly and are not limited to mechanical or physical embodiments, but can include software routines in conjunction with processors, etc.

FIG. 1 is a block diagram of a surveillance system according to an exemplary embodiment.

Referring to FIG. 1, the surveillance system according to an exemplary embodiment may include a network camera 10, a gateway 20, and a network 30.

In the surveillance system according to an exemplary embodiment, information about the network camera 10 collected from the gateway 20 may be transmitted to a server (not shown) via the network 30. A manager may monitor the information transmitted to the server, by using a monitor terminal.

The network camera 10 acquires a surveillance area image by capturing an image of a surveillance area. The network camera 10 may capture, in real time, an image of a surveillance area for various purposes, e.g., surveillance, security, etc. One network camera 10 or a plurality of network cameras 10 may be provided.

The network camera 10 may be a pan-tilt-zoom (PTZ) camera capable of panning, tilting, and zooming. The network camera 10 may be a fisheye camera having an angle of view of over 180 degrees. An image captured by the fisheye camera may be a wide-angle image which has various visual distortions.

The network camera 10 may be a low power camera driven by a battery. The low power camera normally maintains a sleep mode and periodically wakes up to determine whether an event occurs. When an event occurs, the low power camera enters an active mode. Otherwise, the low power camera returns to the sleep mode. Thus, the low power camera enters the active mode only when an event occurs, and therefore, power consumption may be reduced.

The network camera 10 may communicate with the gateway 20 by using various communication methods such as wired/wireless local area network (LAN), Wi-Fi, ZigBee, Bluetooth, and near field communication. For example, the network camera 10 may communicate with the gateway 20 according to a low power wireless communication protocol on a radio frequency in the industrial scientific medical (ISM) bands.

The gateway 20 may determine a state of the network camera 10 based on the information transmitted from the network camera 10, and may transmit a command and/or alarm to the network camera 10 and/or the server according to the state of the network camera 10.

The gateway 20 may transmit information to the server and/or receive a command from the server by using various wired/wireless communication methods such as Ethernet, Wi-Fi, and Bluetooth.

The network 30 may include a wired network and/or a wireless network. The wireless network may include a second generation (2G) and/or third generation (3G) cellular communication system, a third generation partnership project (3GPP), a fourth generation (4G) communication system, long-term evolution (LTE), and world interoperability for microwave access (WiMAX).

Figure 2:
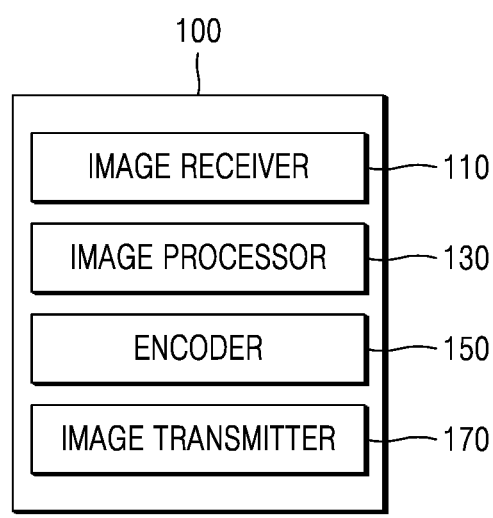
FIG. 2 is a block diagram of an image processing apparatus according to an exemplary embodiment.

FIG. 2 is a block diagram of an image processing apparatus 100 according to an exemplary embodiment.

Referring to FIG. 2, the image processing apparatus 100 according to an exemplary embodiment may include an image receiver 110, an image processor 130, an encoder 150, and an image transmitter 170.

The image receiver 110 receives an image from a camera module.

The image receiver 110 may be a camera module such as a charge-coupled device (CCD) module and/or a complementary metal-oxide-semiconductor (CMOS) module.

The image receiver 110 may be a communication interface to receive an image form the camera module.

The image processor 130 may process an image received from the camera module and transmit a processed image to the encoder 150.

The image processor 130 may enhance an edge of an image received from the image receiver 110.

The image processor 130 may also increase or decrease an edge enhancement level of an image. For example, the image processor 130 may increase or decrease an edge enhancement level of a next image, in response to a control signal received from the encoder 150 that compresses a current image.

The image processor 130 may remove noise from the image received from the image receiver 110.

The image processor 130 may also increase or decrease a noise removal level of an image. For example, the image processor 130 may increase or decrease a noise removal level of a next image, in response to a control signal received from the encoder 150 that compresses the current image.

The image processor 130 may synthesize an edge-enhanced image and a noise-removed image. In the following description, a synthesized image denotes an image obtained by synthesizing an edge-enhanced image and a noise-removed image.

Accordingly, the image processor 130 may acquire a clearer image.

The image processor 130 may remove high frequency from the synthesized image. An image captured by the network camera 10 in a low light environment may include a large number of high frequency components. The image processor 130 may remove the high frequency components from an image by using a low pass filter before the image is quantized by the encoder 150. Accordingly, a compression efficiency of the image captured in a low light environment may be improved.

The image processor 130 may increase or decrease a cutoff frequency that is used to remove a high frequency from the synthesized image. For example, the image processor 130 may increase a cutoff frequency corresponding to an event detected from an image. In another example, the image processor 130 may increase or decrease a cutoff frequency level of a next image according to a control signal received from the encoder 150 that compresses the current image.

The image processor 130 may downsize the synthesized image at a predetermined rate. For example, the image processor 130 may reduce a size of the synthesized image or decrease a resolution of the synthesized image, but the exemplary embodiments are not limited thereto.

The image processor 130 may detect an event by analyzing in real time an image received from the camera module.

The event may be at least one of, in an image, a movement of an object, a change of a scene, generation of noise, a movement of a background, panning, tilting, or zooming of the camera module, and detection of a human face, but the exemplary embodiments are not limited thereto.

The image processor 130 may set an event detection area as a region of interest (ROI). The ROI may be at least a part of the image and one or more ROI may be set.

When an event is detected, the image processor 130 may transmit event information to the encoder 150. The event information may include at least one of an event generation signal, an event identification signal, and an ROI information, but the exemplary embodiments are not limited thereto.

In an exemplary embodiment, the image processor 130 enhances an edge of an image, removes noise of the image, synthesizes an edge-enhanced image and a noise-removed image, downsizes a synthesized image, and removes a high frequency from the synthesized image. The image processor 130 may transmit a downsized image and a high-frequency removed image, to the encoder 150.

In the following description, the downsized image denotes an image obtained by downsizing the synthesized image. The high-frequency removed image denotes an image obtained by removing high frequency from the synthesized image.

According to another exemplary embodiment, the image processor 130 enhances an edge of an image, removes noise of the image, synthesizes an edge-enhanced image and a noise-removed image, and removes high frequency from a synthesized image. The image processor 130 may transmit the high-frequency removed image to the encoder 150.

The encoder 150 may compress the image processed by the image processor 130.

The encoder 150 may pre-encode the image downsized by the image processor 130 by using predetermined quantization parameter (QP) values, and obtain a pre-bit rate of a pre-encoded image. The pre-bit rate may indicate a bit rate of a pre-encoded image. The pre-encoded image may not be transferred to the image transmitter 170.

In the following description, the pre-encoded image indicates an image obtained by pre-encoding the downsized image.

The encoder 150 may determine the QP value based on a reference bit rate and the pre-bit rate. The reference bit rate may indicate an allowable maximum output bit rate and may be preset. The pre-bit rate may be a bit rate overshoot of the pre-encoded image, but the exemplary embodiments are not limited thereto.

The encoder 150 may compare a reference bit rate reduced by a predetermined rate based on the pre-bit rate. The predetermined rate may be the same as the predetermined rate used to downsize the synthesized image by the image processor 130. In the following description, the reference bit rate reduced by the predetermined rate used to downsize the synthesized image by the image processor 130 may be referred to as a downsized reference bit rate.

When the pre-bit rate is greater than the downsized reference bit rate, the encoder 150 may set the QP value corresponding to the reference bit rate. In other words, when the pre-bit rate exceeds the downsized reference bit rate, the encoder 150 may set the QP value to be greater than the existing QP value to reduce the bit rate.

When the pre-bit rate is equal to or less than the downsized reference bit rate, the encoder 150 may maintain the QP value. In other words, when the pre-bit rate is equal to or less than the downsized reference bit rate, the encoder 150 may maintain the existing QP value.

The encoder 150 may compress an image based on the event information received from the image processor 130.

The encoder 150 may determine a frame rate of the high-frequency removed image corresponding to the event.

For example, the encoder 150 may increase a frame rate of an image at a time point when an event is detected. In another example, the encoder 150 may decrease a frame rate of an image at a time point when no event is detected. In another example, the encoder 150 may increase a frame rate of an image at a time point when an event is detected, and may decrease a frame rate of an image at a time point when no event is detected.

As such, when the frame rate of an image is changed according to the detection of an event, a network traffic amount and the amount of data stored in a storage device may be reduced. In other words, according to an exemplary embodiment, image distortion may be reduced and loss of resources may be accordingly reduced.

The encoder 150 may obtain a current bit rate of a current image received from the image processor 130. The current bit rate may indicate a bit rate of the current image. The current image is compresses and transferred to the image transmitter 170.

When a current bit rate is greater than the reference bit rate, the encoder 150 may transfer a control signal to the image processor 130. The control signal may include at least one of information that the current bit rate is greater than the reference bit rate, an edge enhancement level-up signal indicating that an edge enhancement level is to be increased, a noise removal level-up signal indicating that a noise removal level is to be increased, and a cutoff frequency level-up signal indicating that a cutoff frequency level is to be increased.

As such, because a bit rate of a current image is used to determine an image processing level of a next image, an image having desirable real-time properties may be provided.

The encoder 150 may insert an intra (I) frame corresponding to an event, during the compression of the high-frequency removed image. In other words, the encoder 150 may insert an (I) frame when an event is detected and the encoder 150 may insert a predictive (P) frame when not event is detected. For example, the encoder 150 may insert the (I) frame only when an event is detected.

As such, because the I frame is inserted when an event is detected, an output bit rate of a high quality image may be efficiently reduced.

The encoder 150 may determine the QP value corresponding to an event. For example, when event information is received from the image processor 130, the encoder 150 may increase the QP value. The event information may indicate a rapid change occurring in an image such as, for example, a fast movement of an object or a quick scene change.

As such, because the QP value is increased corresponding to the event, a bit rate overshoot due to the rapid change of an image may be reduced. Accordingly, in an exemplary embodiment, a problem occurring in the network or the storage device due to the overshoot of an output bit rate may be prevented.

The encoder 150 may set the QP values of the ROI and a non-ROI to be different from each other. For example, when event information including ROI information is received from the image processor 130, the encoder 150 may decrease the QP value of the ROI. In another example, the encoder 150 may increase the QP value of the non-ROI. In another example, the encoder 150 may decrease the QP value of the ROI and increase the QP value of the non-ROI. For example, the encoder 150 may decrease the QP value only in the ROI.

As a result, because the compression rate decreases in the ROI, the output bit rate of a high quality image may be efficiently reduced.

The encoder 150 compresses the high-frequency removed image according to the QP value. The encoder 150 may compress an image according to a preset QP value. The encoder 150 may decrease a compression rate of an image by increasing the QP value and increase the compression rate of an image by decreasing the QP value.

In an exemplary embodiment, the encoder 150 receives a downsized image and a high-frequency removed image from the image processor 130. The encoder 150 pre-encodes the downsized image, obtains a pre-bit rate of a pre-encoded image, sets a QP value based on the reference bit rate and the pre-bit rate, and compresses the high-frequency removed image according to a set QP value. The encoder 150 transfers the compressed image to the image transmitter 170.

According to another exemplary embodiment, the encoder 150 receives a high-frequency removed image from the image processor 130. The encoder 150 sets the QP value and compresses the high-frequency removed image according to the set QP value. The encoder 150 transfers a compressed image to the image transmitter 170.

According to another exemplary embodiment, the encoder 150 receives a high-frequency removed image from the image processor 130. The encoder 150 increases a frame rate corresponding to an event and compresses the high-frequency removed image according to an increased frame rate. The encoder 150 transfers a compressed image to the image transmitter 170.

The image transmitter 170 transmits the compressed image to the outside. The image transmitter 170 may transmit the compressed image to the gateway 20 and/or the network 30.

In an exemplary embodiment, the image processing apparatus 100 may be implemented by the network camera 10 of FIG. 1 or an apparatus separate from the network camera 10 of FIG. 1. In an exemplary embodiment, some of the elements included in the image processing apparatus 100 may be implemented by or provided as the network camera 10 of FIG. 1, and other elements may be implemented by or provided as an apparatus separate from the network camera 10 of FIG. 1.

Figure 3:
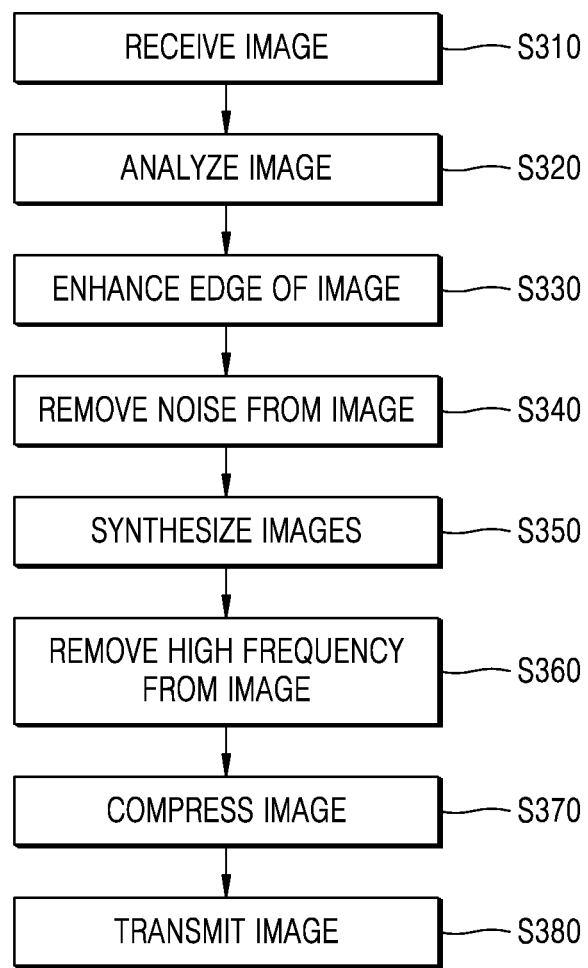
FIG. 3 is a flowchart of an image processing method according to an exemplary embodiment.

FIG. 3 is a flowchart of an image processing method according to an exemplary embodiment.

Referring to FIGS. 2 and 3, when the image receiver 110 receives an image from the camera module (S310), the image processor 130 analyzes the image (S320) and processes the image (S330 to S360).

The image processor 130 may generate event information by analyzing the image.

The image processor 130 enhances an edge of the image (S330), removes noise from the image (S340), and synthesizes an edge-enhanced image and a noise-removed image (S350).

The image processor 130 removes high frequency from a synthesized image (S360).

In an exemplary embodiment, when an event is detected from the image, the image processor 130 increases a cutoff frequency that is used to remove high frequency from the synthesized image.

According to another exemplary embodiment, the image processor 130 downsizes the synthesized image.

The encoder 150 compresses a high-frequency removed image (S370).

In an exemplary embodiment, the encoder 150 compresses the high-frequency removed image according to a predetermined QP value.

According to another exemplary embodiment, the encoder 150 pre-encodes a downsized image and obtains a pre-bit rate of a pre-encoded image. The encoder 150 sets a QP value based on a reference bit rate and the pre-bit rate, and compresses the high-frequency removed image according to the set QP value.

According to another exemplary embodiment, when an event is detected from an image, the encoder 150 increases a frame rate corresponding to the event. The encoder 150 compresses the high-frequency removed image according to an increased frame rate.

The image transmitter 170 transmits a compressed image to the outside (S380).

In the following description, repetitive descriptions of structures and operations described above will be omitted or briefly provided.

Figure 4:
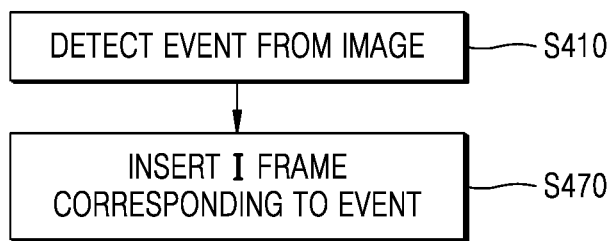
FIG. 4 is a flowchart of an image compression method according to an exemplary embodiment.

FIG. 4 is a flowchart of an image compression method according to an exemplary embodiment.

Referring to FIGS. 2 and 4, when the image processor 130 detects an event from an image (S410), the encoder 150 inserts an I frame corresponding to the event (S470).

In other words, according to an exemplary embodiment, the image processing apparatus 100 determines whether to insert an I frame according to the detection of an event from the image and thus a transmission bit rate of a high quality image may be efficiently controlled.

Figure 5:
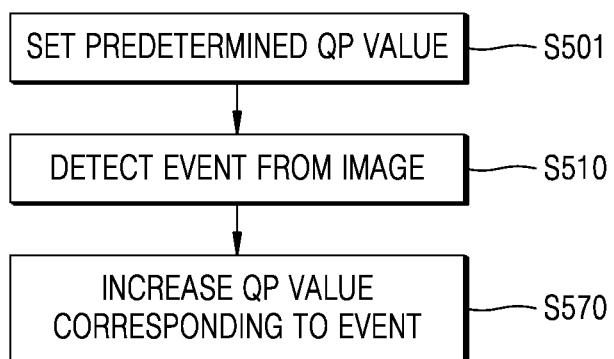
FIG. 5 is a flowchart of an image compression method according to another exemplary embodiment.

FIG. 5 is a flowchart of an image compression method according to another exemplary embodiment.

Referring to FIGS. 2 and 5, the encoder 150 previously sets a predetermined QP value (S501).

Next, when the image processor 130 detects an event from an image (S510), the encoder 150 increases the predetermined QP value corresponding to the event (S570).

In other words, in an exemplary embodiment, the image processing apparatus 100 determines a compression rate of an image according to the detection of an event from the image and thus a transmission bit rate may be controlled to be constant or substantially constant.

Figure 6:
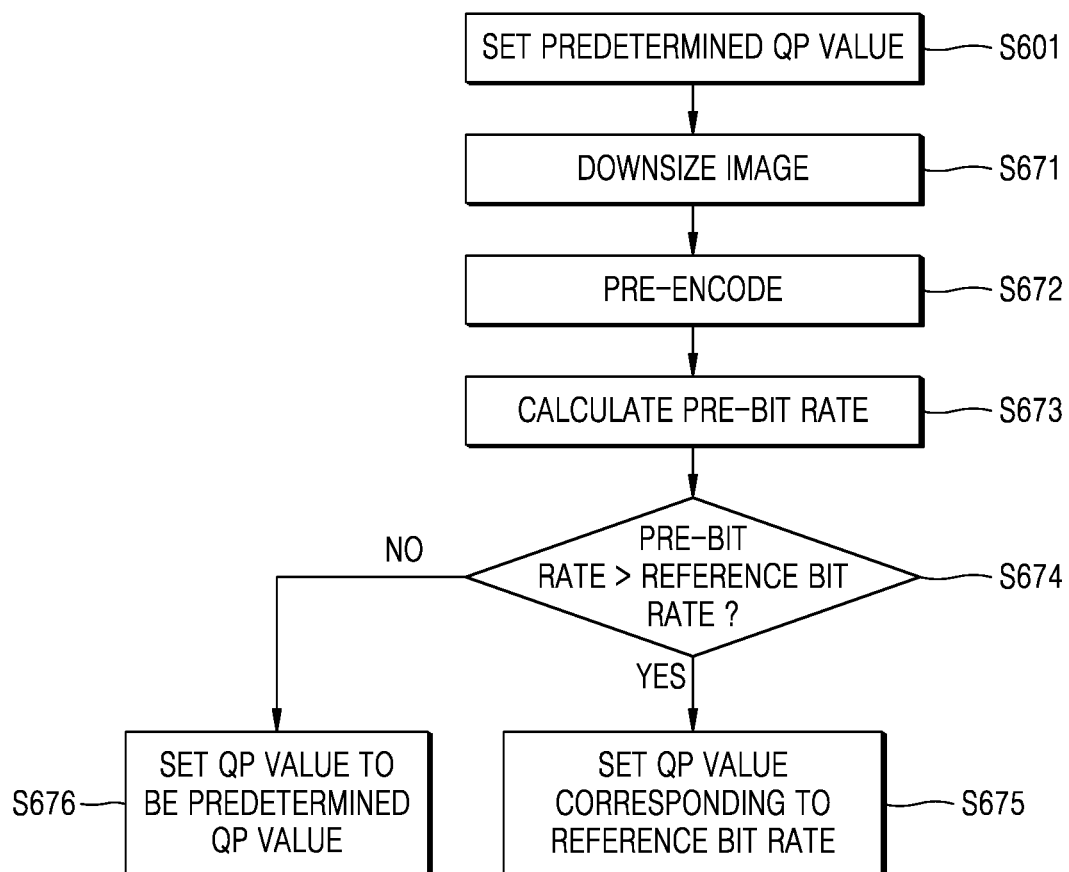
FIG. 6 is a flowchart of an image compression method according to another exemplary embodiment.

FIG. 6 is a flowchart of an image compression method according to another exemplary embodiment.

Referring to FIGS. 2 and 6, the encoder 150 previously sets a predetermined QP value (S601). The encoder 150 may previously set a reference bit rate.

The image processor 130 may downsize an image at a predetermined rate (S671). For example, the image processor 130 may downsize an image that is synthesized by the image processor 130.

Next, the encoder 150 pre-encodes a downsized image (S672) and obtains a pre-bit rate of a pre-encoded image (S673).

When the pre-bit rate is greater than the reference bit rate (S674), the encoder 150 sets the QP value corresponding to the reference bit rate (S675).

Here, the encoder 150 may set the QP value to be greater than the previously set predetermined QP value so that the pre-bit rate is the same as the reference bit rate.

When the pre-bit rate is less than the reference bit rate (S674), the encoder 150 sets the QP value to be the predetermined QP value set in operation S601 (S676).

In other words, in an exemplary embodiment, the image processing apparatus 100 determines a compression rate of an image according to a result of the pre-encoding of the image and thus a transmission bit rate may be efficiently controlled.

Figure 7:
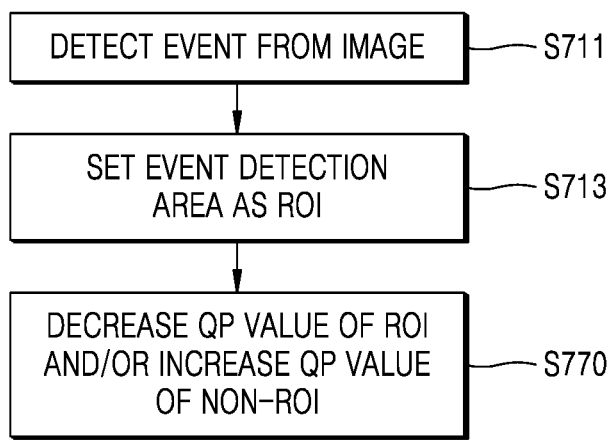
FIG. 7 is a flowchart of an image compression method according to another exemplary embodiment.

FIG. 7 is a flowchart of an image compression method according to another exemplary embodiment.

Referring to FIGS. 2 and 7, when an event is detected from an image (S711), the image processor 130 sets an area in which the event is detected as an ROI (S713).

Next, the encoder 150 decreases a QP value of the ROI, increases a QP value of a non-ROI, or decreases the QP value of the ROI while increasing the QP value of the non-ROI (S770).

In other words, in an exemplary embodiment, the image processing apparatus 100 determines a compression rate of at least a part of an image to be different from a compression rate of another part of the image. Accordingly, the transmission bit rate may be efficiently controlled.

Figure 8:
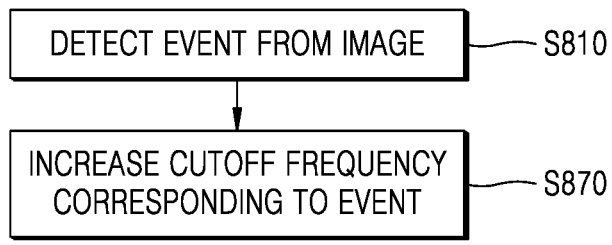
FIG. 8 is a flowchart of an image compression method according to another exemplary embodiment.

FIG. 8 is a flowchart of an image compression method according to another exemplary embodiment.

Referring to FIGS. 2 and 8, when an event is detected from an image (S810), the image processor 130 increases a cutoff frequency, which is used to remove a high frequency from the image, corresponding to the event (S870).

In other words, in an exemplary embodiment, the image processing apparatus 100 determines a cutoff frequency to remove a high frequency according to the detection of an event in the image, and thus, a compression efficiency of a transmitted image may be improved.

Figure 9:
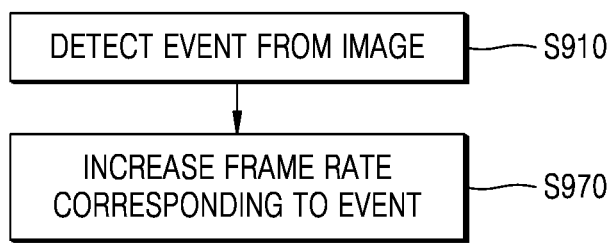
FIG. 9 is a flowchart of an image compression method according to another exemplary embodiment.

FIG. 9 is a flowchart of an image compression method according to another exemplary embodiment.

Referring to FIGS. 2 and 9, when the image processor 130 detects an event from an image (S910), the encoder 150 increases an output frame rate according to the event (S970).

In other words, in an exemplary embodiment, the image processing apparatus 100 determines an output frame rate according to detection of an event in the image, and thus, a transmission bit rate may be efficiently controlled.

Figure 10:
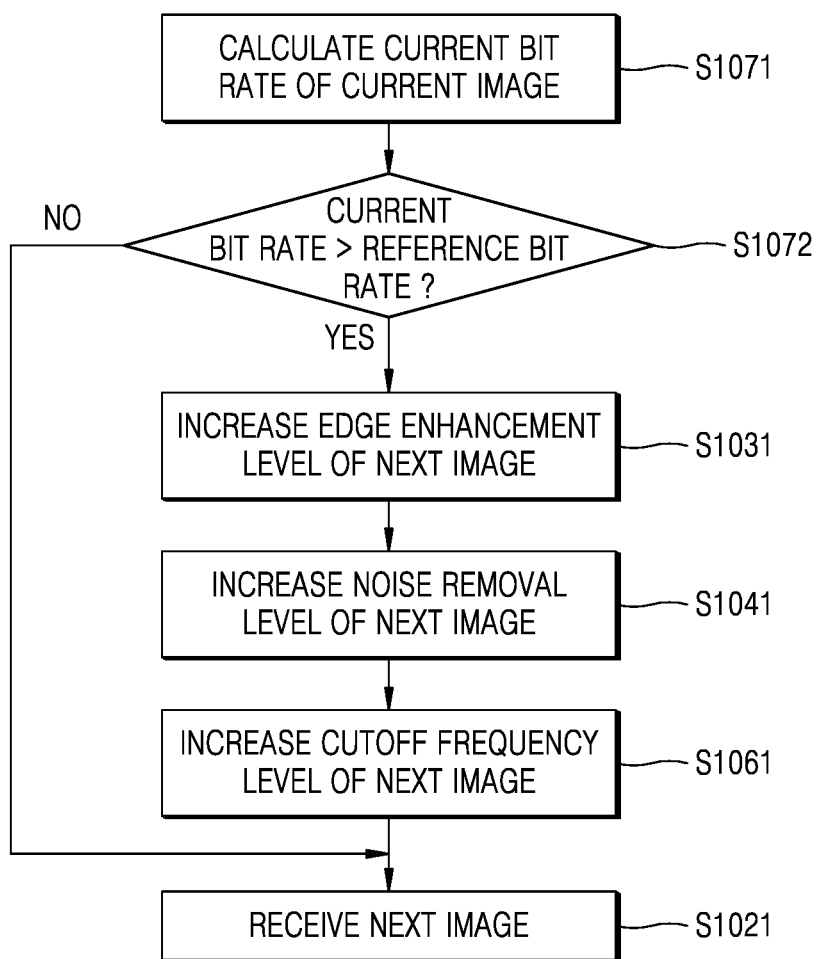
FIG. 10 is a flowchart of an image processing method according to another exemplary embodiment.

FIG. 10 is a flowchart of an image processing method according to another exemplary embodiment.

Referring to FIGS. 2 and 10, the encoder 150 obtains a current bit rate of a current image (S1071). The current image denotes an image compressed after a high frequency is removed.

Next, the encoder 150 may compare a current bit rate with a reference bit rate. The image processor 130 may perform at least one of operations from S1031 to S1061 according to a result of the comparison between the current bit rate and the reference bit rate.

In response to the current bit rate being greater than the reference bit rate (S1072), the image processor 130 may increase an edge enhancement level of a next image (S1031).

In response to the current bit rate being greater than the reference bit rate (S1072), the image processor 130 may increase a noise removal level of the next image (S1041).

In response to the current bit rate being greater than the reference bit rate (S1072), the image processor 130 may increase a cutoff frequency level of the next image (S1061).

Next, the image receiver 110 receives the next image (S1021). The next image denotes an image received after the current image is received.

Although it is not illustrated, the image processor 130 may process the next image based on the changed edge enhancement level, noise removal level, and/or cutoff frequency level according to a result of at least one of operations from S1031 to S1061.

In response to the current bit rate being less than the reference bit rate (S1072), the image processor 130 maintains the edge enhancement level, noise removal level, and/or cutoff frequency level of the next image to be the same as that of the current image.

Although it is not illustrated, the image processor 130 may enhance an edge of the next image, remove noise from the next image, synthesize the edge-enhanced next image and the noise-removed next image, and remove high frequency from the synthesized next image.

In other words, in an exemplary embodiment, the image processing apparatus 100 determines a transmission bit rate of the next image based on a transmission bit rate of the current image. Thus, the transmission bit rate may be efficiently controlled.

According to the above-described exemplary embodiments, an apparatus and a method for processing an image, in which a transmission bit rate is reduced, may be provided.

Furthermore, according to the exemplary embodiments, a high quality image may be obtained.

Furthermore, according to the exemplary embodiments, because a high frequency is removed prior to compression of an image, an image compression efficiency may be further improved.

Furthermore, according to the exemplary embodiments, image distortion may be reduced and loss of resources may also be reduced.

Furthermore, according to the exemplary embodiments, an image with desired real-time properties may be provided.

Furthermore, according to the exemplary embodiments, an output bit rate of a high quality image may be efficiently controlled.

Furthermore, according to the exemplary embodiments, because overshoot of an output bit rate is controlled, an image may be more stably transmitted or stored.

A method according to the exemplary embodiments may be embodied as program commands executable by various computers and may be recorded on a non-transitory computer-readable recording medium. The non-transitory computer-readable recording medium may include program commands, data files, data structures, and the like separately or in combinations. The program commands to be recorded on the non-transitory computer-readable recording medium may be specially designed and configured for embodiments of the inventive concept or may be well-known to and be usable by one of ordinary skill in the art of computer software. Examples of the non-transitory computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as an optical disk, and a hardware device specially configured to store and execute program commands such as a ROM, a random-access memory (RAM), or a flash memory. Examples of the program commands are advanced language codes that can be executed by a computer by using an interpreter or the like as well as machine language codes made by a compiler.

At least one of the components, elements, modules or units represented by a block as illustrated in the drawings may be embodied as various numbers of hardware, software and/or firmware structures that execute respective functions described above, according to the exemplary embodiments. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An image processing apparatus, comprising:
an image processor configured to detect an event from an input image, enhance an edge of the input image, and remove noise from the input image; and
an encoder configured to compress the input image,
wherein the encoder is configured to control at least one of an I frame insertion, a frame rate, or a compression rate of a second area other than a first area, in which the event is detected in the input image, according to a result of event detection by the image processor, and
wherein the encoder is configured to obtain a current bit rate of the compressed image, and in response to determining that the current bit rate is greater than a reference bit rate, the image processor is configured to increase at least one of a noise removal level or an edge enhancement level of a next image.

2. The image processing apparatus of claim 1, wherein, in response to detecting the event in the input image by the image processor, the encoder is configured to increase the compression rate of the second area by increasing a quantization parameter value of the second area.

3. The image processing apparatus of claim 1, wherein, in response to detecting the event in the input image by the image processor, the encoder is configured to insert an I frame.

4. The image processing apparatus of claim 1, wherein, in response to detecting the event in the input image by the image processor, the encoder is configured to increase the frame rate of the input image.

5. The image processing apparatus of claim 1, wherein the event comprises at least one of a movement of an object, a change of a scene, generation of the noise, a movement of a background, panning of a camera module, tilting of the camera module, zooming of the camera module, or detection of a human face in the input image.

6. The image processing apparatus of claim 1, wherein the image processor is configured to remove a high frequency from the input image, and
wherein in response to detecting the event in the input image, the image processor is configured to increase a cutoff frequency to remove the high frequency from the input image.

7. The image processing apparatus of claim 1, wherein the image processor is configured to remove a high frequency from the input image, and
wherein, in response to determining that the current bit rate is greater than the reference bit rate, the image processor is configured to increase a cutoff frequency level to remove the high frequency from the next image.

8. The image processing apparatus of claim 1, wherein, in response to detecting that the event is a rapid change occurring in the input image, the encoder is configured to increase a quantization parameter value of the input image.

9. An image processing method, comprising:
detecting, by an image processor, an event from an input image;
enhancing, by the image processor, an edge of the input image;
removing, by the image processor, noise from the input image; and
compressing, by an encoder, the input image,
the method further comprising:
controlling, by the encoder, at least one of an I frame insertion, a frame rate, or a compression rate of a second area, other than a first area in which the event is detected in the input image, according to a result of event detection;
obtaining, by the encoder, a current bit rate of the compressed image; and
in response to determining that the current bit rate is greater than a reference bit rate by the encoder, increasing, by the image processor, at least one of a noise removal level or an edge enhancement level of a next image.

10. The image processing method of claim 9, wherein the controlling comprises, in response to detecting the event in the input image by the image processor, increasing the compression rate of the second area by increasing a quantization parameter value of the second area by the encoder.

11. The image processing method of claim 9, wherein the controlling comprises, in response to detecting the event in the input image by the image processor, inserting an I frame by the encoder.

12. The image processing method of claim 9, wherein the controlling comprises, in response to detecting the event in the input image by the image processor, increasing the frame rate of the input image by the encoder.

13. The image processing method of claim 9, wherein the event comprises at least one of a movement of an object, a change of a scene, generation of the noise, a movement of a background, panning of a camera module, tilting of the camera module, zooming of the camera module, or detection of a human face in the input image.

14. The image processing method of claim 9, further comprising:
removing, by the image processor, a high frequency from the input image, and
in response to detecting the event in the input image, increasing, by the image processor, a cutoff frequency to remove the high frequency from the input image.

15. The image processing method of claim 9, further comprising:
removing, by the image processor, a high frequency from the input image, and
in response to determining that the current bit rate is greater than the reference bit rate by the encoder, increasing, by the image processor, a cutoff frequency level to remove the high frequency from the next image.

16. The image processing method of claim 9, further comprising, in response to detecting that the event is a rapid change occurring in the input image by the image processor, increasing a quantization parameter value of the input image by the encoder.

17. An image processing apparatus, comprising:
an image processor configured to process an edge enhancement and a noise removing on an input image and downsize the input image; and
an encoder configured to set a quantization parameter value of the input image by analyzing the downsized image and compress the input image based on the quantization parameter value.

18. The image processing apparatus of claim 17, wherein the encoder is configured to pre-encode the downsized image to obtain a pre-bit rate, which is a bit rate of the pre-encoded image, and set the quantization parameter value based on a result of comparison between a reference bit rate and the pre-bit rate.

19. The image processing apparatus of claim 18, wherein, in response to determining that the pre-bit rate is greater than a downsized reference bit rate, the encoder is configured to set the quantization parameter value to be greater than a previously set predetermined quantization parameter value, and
wherein the downsized reference bit rate is the reference bit rate reduced by a rate in which the input image is downsized to the downsized image.

20. The image processing apparatus of claim 18, wherein the encoder is configured to obtain a current bit rate of the compressed image, and in response to determining that the current bit rate is greater than the reference bit rate, the image processor is configured to increase at least one of a noise removal level or an edge enhancement level of a next image.

* * * * *